United States Patent
Jeanes et al.

(10) Patent No.: US 11,244,441 B1
(45) Date of Patent: Feb. 8, 2022

(54) ROBOTIC PALLETIZER CONTROL SYSTEM WITH AUGMENTED CONFIRMATION

(71) Applicant: ILLINOIS TOOL WORKS INC., Glenview, IL (US)

(72) Inventors: Justin Andrew Jeanes, Piedmont, SC (US); Devin Gregory Staack, Simpsonville, SC (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/427,483

(22) Filed: May 31, 2019

Related U.S. Application Data (60) Provisional application No. 62/679,385, filed on Jun. 1, 2018.

(51) Int. Cl.
| | |
|---|---|
| G06T 7/00 | (2017.01) |
| H04N 5/445 | (2011.01) |
| B65G 61/00 | (2006.01) |
| H04N 5/272 | (2006.01) |
| G06F 3/0481 | (2013.01) |
| G06T 11/60 | (2006.01) |

(52) U.S. Cl.
CPC .............. *G06T 7/001* (2013.01); *B65G 61/00* (2013.01); *G06F 3/0481* (2013.01); *G06T 11/60* (2013.01); *H04N 5/272* (2013.01); *H04N 5/445* (2013.01)

(58) Field of Classification Search
None
See application file for complete search history.

(56) References Cited

U.S. PATENT DOCUMENTS

| | | | |
|---|---|---|---|
| 9,233,470 B1* | 1/2016 | Bradski ................ | G06K 9/6202 |
| 2002/0056253 A1* | 5/2002 | DeGrasse ............ | B65B 11/045 |
| | | | 53/399 |
| 2019/0279426 A1* | 9/2019 | Musunur ................ | G06T 19/20 |

OTHER PUBLICATIONS

Co-pending U.S. Appl. No. 16/427,473. J.A. Jeanes et al., "Robotic Palletizer Control System With Graphical Visual Confirmation," filed May 31, 2019.
https://web.archlve.org/web/20170523075240/http://www.hartness.com/?page id=2204&preview=true, Hartness, An ITW Company, "Hartness Connect," website, May 23, 2017 (1 page).

* cited by examiner

*Primary Examiner* — Xin Sheng
(74) *Attorney, Agent, or Firm* — Pauley Erickson & Swanson (57) ABSTRACT

A control system and method for a robotic palletizer. The control system and method include or are implemented by a home screen displaying a plurality of application icons. The applications each provide a quick access to control features and methods. The control system includes methods and components for planning and/or monitoring a product pallet configuration by the palletizer. Animation and/or other virtual depiction of the palletization is displayed through a graphical user interface for the palletizer. The animation and/or other virtual depiction can illustrate the conveyor palletization before or during the palletization and/or provide an augmented confirmation overlaying a video feed of a palletization of a plurality of products.

17 Claims, 6 Drawing Sheets

ROBOTIC PALLETIZER CONTROL SYSTEM WITH AUGMENTED CONFIRMATION

CROSS REFERENCE TO RELATED APPLICATION

This application claims the benefit of U.S. Provisional Application Ser. No. 62/679,385, filed on 1 Jun. 2018. This U.S. Provisional Application is hereby incorporated by reference herein in its entirety and are made a part hereof, including but not limited to those portions which specifically appear hereinafter.

BACKGROUND OF THE INVENTION

Field of the Invention

This invention relates to robotic palletization and more particularly to an apparatus and method for controlling, planning, and/or monitoring robotic or automated palletization.

Description of Prior Art

Environmental considerations and cost saving initiatives continue to result in the growth of lighter weight primary and secondary packaging, as well as the use of alternative packaging materials such as film and flexible packaging. Consumer desire for greater choice continues to rapidly increase the number of SKUs for all manufacturers. These fundamental changes in the market are forcing manufacturers to consider alternative product handling solutions. Flexibility and gentle handling are more critical than ever. The growth of robotic palletization responds to the changing needs of the market. Robotic palletization can provide flexibility, versatility, and/or gentle handling of lightweight primary and secondary packaging.

Under some circumstances, the palletizer operator needs to confirm that the number of products located in an area of a cell matches the number of products the palletizer software expects to be there. As such, the operator occasionally needs to manually intervene to add, remove, or rearrange products to coincide with the software expectation. This can be difficult, often because the control panel only gives a number and the operator must determine if the products are located correctly. If this is done incorrectly, problems can occur, such as damage to products or equipment. Thus there is a continuing needs for improvements to the human-machine interface for robotic palletizers.

SUMMARY OF THE INVENTION

The present invention provides an improved human-machine interface (HMI), via an apparatus and method for controlling, planning, and/or monitoring robotic palletization. Embodiments of this invention include an interface (software and hardware) that is integrated with machinery to facilitate communication between the user and the equipment or system. The invention provides a computer-executed platform with an intuitive interface and that hosts a suite of applications or apps that improve efficiency and utilization in all aspects of owning, operating, and maintaining palletization equipment.

The invention includes a method of planning or monitoring a product pallet configuration by a palletizer. Embodiments of the invention graphically animate a palletization of a plurality of products through a graphical user interface (GUI) of a control device of the palletizer. The animating can illustrate the placement of a number of products as expected by the control device on the GUI, such for confirmation of the palletization prior to initiation of the palletizer. The animating can illustrate the palletization to be performed by the palletizer, such as by illustrating the plurality of products traveling individually on a conveyor, relative to each other, into a predetermined pallet configuration.

The invention further relates to or includes a palletizer with a product conveyor and a robotic arm extending over the product conveyor to place each of a plurality of products in a predetermined position on the conveyor to form a product layer for a pallet. A control device and a GUI are in operable connection with each other and the product conveyor and the robotic arm. A pallet depiction module that is executable by the control device provides a virtual depiction of a palletization of a plurality of products via the graphical user interface. The pallet depiction module implements the methods discussed above, and/or provides an animated depiction of a formation of the palletization. The virtual depiction desirably illustrates placement of a number of products expected for the palletization by the control device, and illustrates of the plurality of products traveling individually, and relative to each other as placed by the robotic arm, on the product conveyor into a predetermined pallet configuration. Embodiments of the pallet depiction module further provide a pallet image and digital controls on the graphical user interface, where the digital controls move the products on the pallet image to plan or program a pallet layer.

The invention further includes a method of monitoring a product pallet configuration by a palletizer, which can be used in combination with or separately from other virtual or animation methods herein, by graphically overlaying a palletization product layout over a video feed of a palletization of products on a conveyor. The video feed shows the live assembling of products and the augmented reality palletization product layout overlays, for example, a top end of the assembled products as confirmation of the correct configuration. The palletization product layout overlays an area of the palletizer where the products are expected to assemble on the conveyor. The palletization product layout can include a virtual peripheral outline of each of the products in the predetermined orientation expected for the pallet. Each of the virtual product outlines corresponds to a size, shape, orientation, and/or position predetermined for one of the products. Any product not correspondingly overlaid by the palletization product layout indicates a missing or an improperly positioned product.

The invention further includes a palletizer, such as discussed above, with a video recording device in combination with the product conveyor and the control device, and a layout depiction module configured to be executed by the control device to provide the virtual depiction of a palletization product layout of the plurality of products over a video feed via the graphical user interface. The video feed is commonly at an angle, such as an isometric angle, and the virtual depiction is desirably correspondingly angled to match a recording angle of the video feed. The virtual depiction comprises an outline of a top periphery of each of the products in a predetermined orientation, such as a plurality of rectangular or square outlines each corresponding to one of the products in rows representing the rows of the palletization product layout. Again, any product not correspondingly overlaid by the virtual depiction of the palletization product layout indicates a missing or an improperly positioned product.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
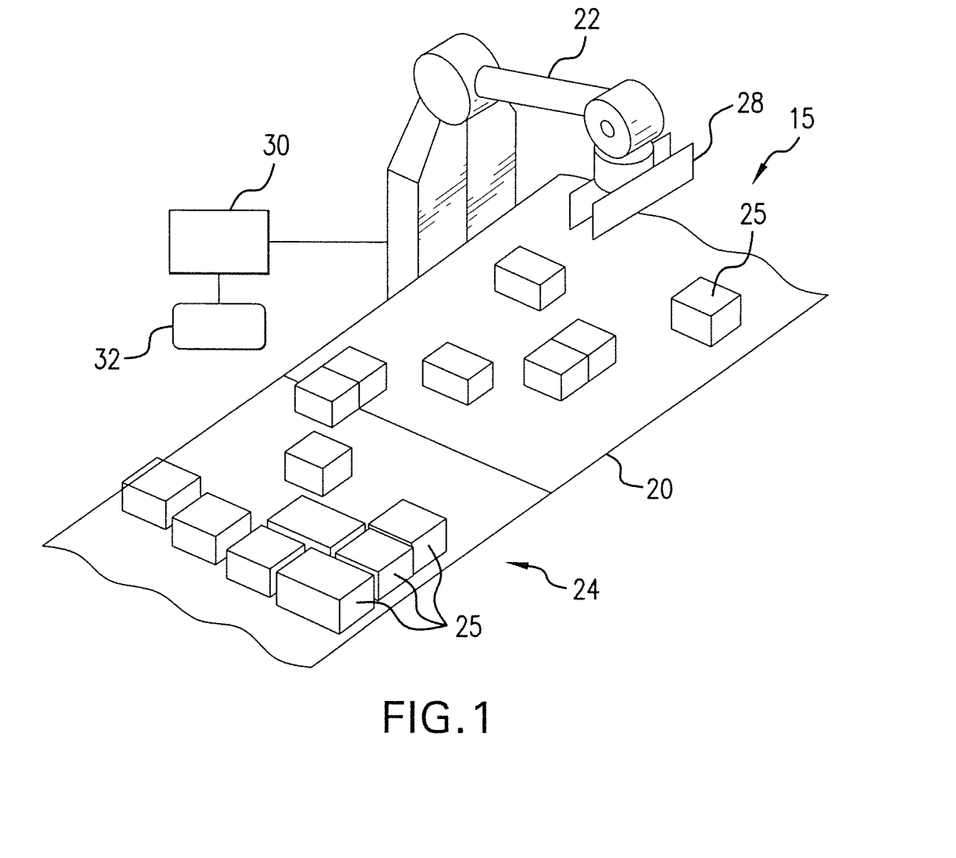
FIG. 1 representatively illustrates a palletizer according to one embodiment of this invention.

FIG. 1 generally illustrates a robotic or automated palletization apparatus 15, where products 25, shown as various sized boxes, on a conveyor 20 are organized or moved on the conveyor 20, such as a multi-belt conveyor, by a robotic arm 22 to result in a product configuration 24 at an end of the conveyor 20. The robotic arm 22 places or moves the products 25 in a position on the conveyor 20 that results in the product configuration 24 matching a predetermined product layout programed into a controller 30 for the robotic arm 22. The robotic arm 22 moves the products by pinchers or claws 28 laterally or otherwise to a position across the width of the conveyor 20, and rotates the products 25 as needed, to allow the products to travel downstream into and forming the product configuration 24 that matches the programmed layout for subsequent loading onto a pallet (not shown).

The controller 30 desirably includes a computer and/or data processor and a recordable memory medium, such as a hard drive or flash memory. The controller includes encoded software instructions for executing the robotic or automated palletization apparatus 15, such as coordinating the arm 22 and the conveyor 20. In embodiments of this invention, the controller 30 is connected to a graphical user interface (GUI) 32, to allow use access to the controller 30. The GUI can be local, e.g., on the apparatus 15, and/or remote over a network, but is desirably at least over a local intranet network and, for example, implemented in a browser window.

Figure 2:
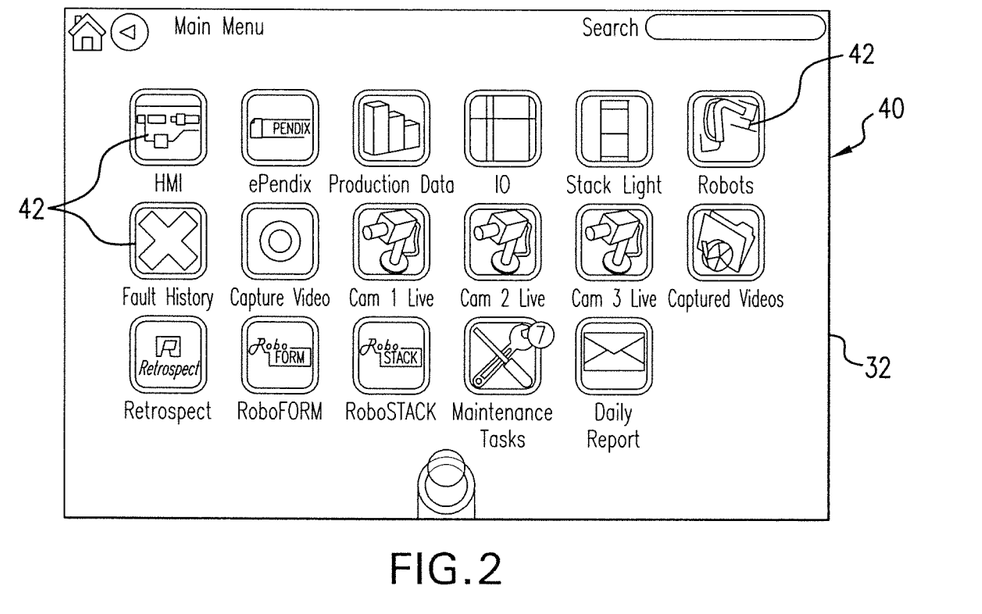
FIG. 2 shows a GUI with a HMI home screen, according to one embodiment of this invention.

Embodiments of this invention use the GUI 32 to display information and/or receive instructions via a control application as a human-machine interface (HMI). FIG. 2 illustrates a control application home screen 40, such as can be displayed on the GUI 32 and used to control the apparatus 15. The control application illustrated in FIG. 2 is designed similar to a smartphone, with application icons 42 each touchscreen accessible to launch a corresponding software application. This app-based home screen 40 provides a format recognizable to today's users and provides efficient training and use, as each app can be opened and closed to find the necessary information and controls.

Figure 3:
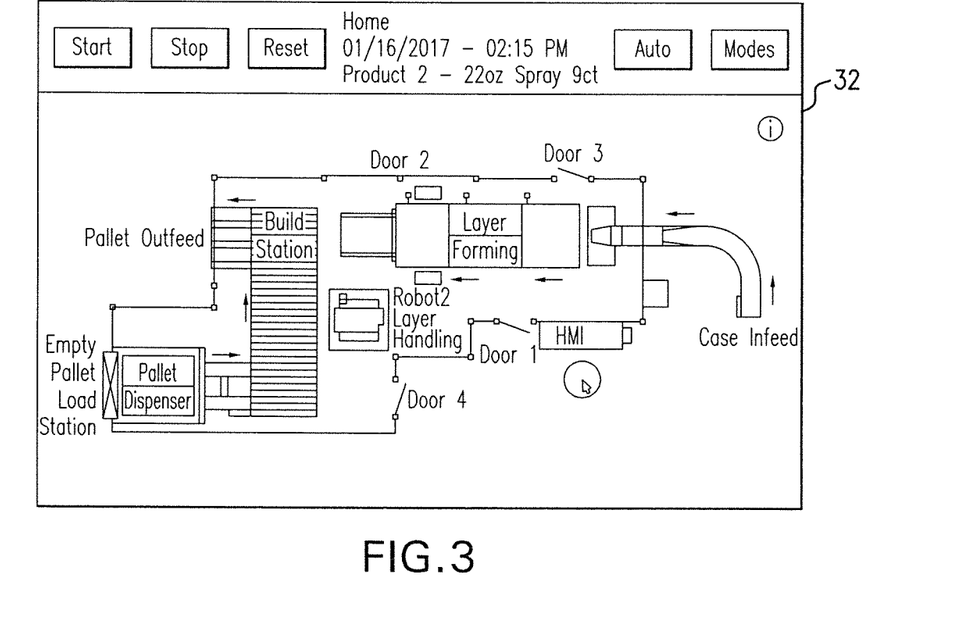
FIG. 3 illustrates a palletizer application displayed on a GUI, according to one embodiment of this invention.
Figure 4:
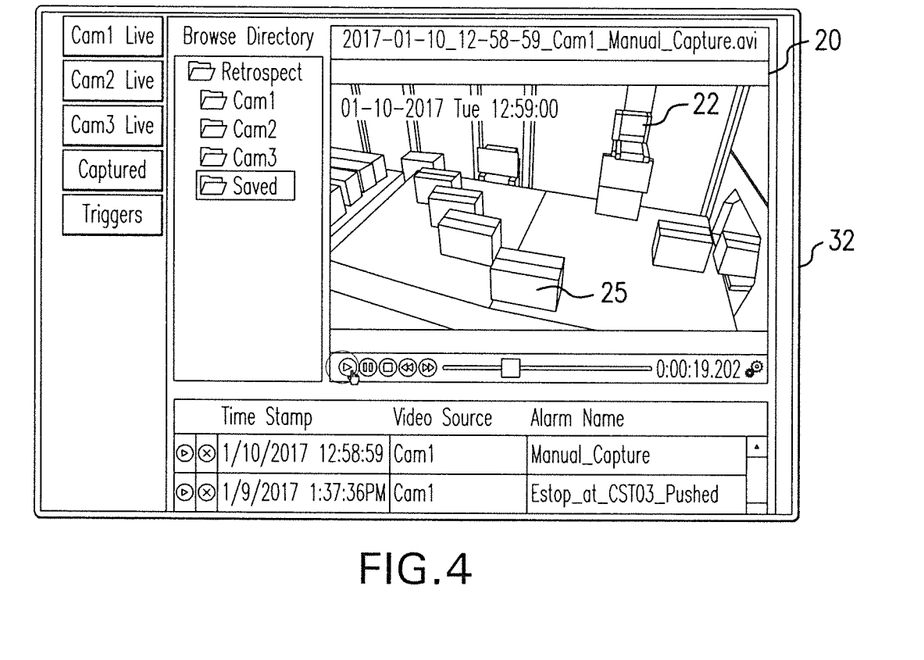
FIG. 4 illustrates a video feed of a conveyor displayed on a GUI, according to one embodiment of this invention.
Figure 5:
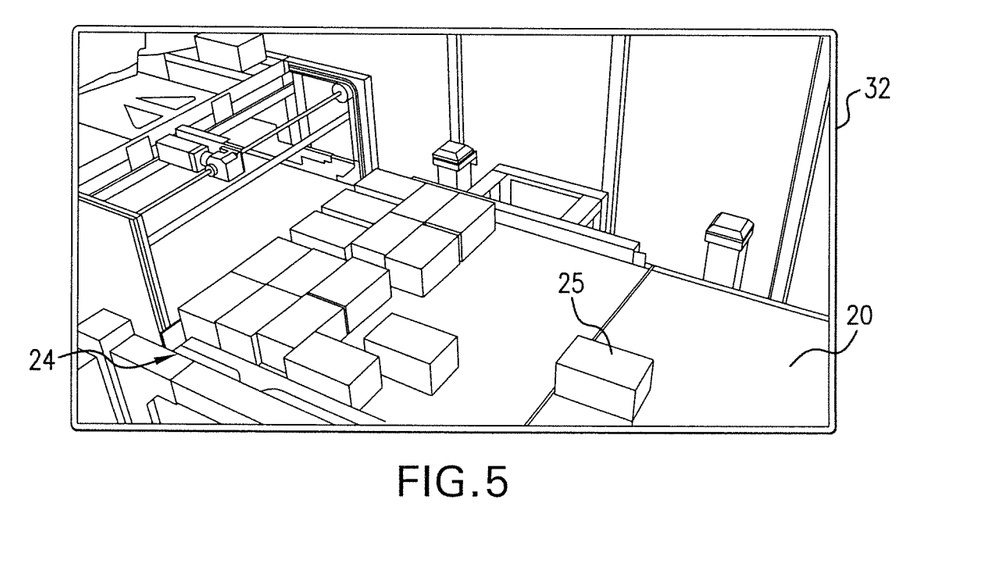
FIG. 5 illustrates a further video feed of a product package assembly area displayed on a GUI, according to one embodiment of this invention.

The HMI of FIG. 2 allows for troubleshooting and maintenance in an intuitive way. For example, one app icon can launch a diagnosis tool that helps diagnose a root cause of a problem. Another exemplary app icon 42 can launch an interactive digital training tool. The HMI further provides icons 42 that open various video feeds of the apparatus 15. FIG. 3 shows an exemplary HMI screen, showing a general layout of a palletization apparatus, and having control buttons 44 such as for starting, stopping, and resetting, etc. the apparatus. FIG. 4 shows an exemplary app displaying video feed of the apparatus, and more particularly a robotic arm 22 operation moving packages into position on a conveyor 20. FIG. 5 shows a second camera feed angled and showing the products assembling according to a product configuration 24 matching the predetermined product layout programed into the controller.

The invention includes a method of planning and/or monitoring a product pallet configuration by a palletizer. The method is desirably implemented by software modules stored in the controller and accessible by an app icon 42 in FIG. 2. In embodiments of this invention, the method is implemented via pallet formation animation. The animation is generated by the controller through the GUI, and allows for efficient pallet planning, robot programing, and/or pallet layer build monitoring.

Figure 6:
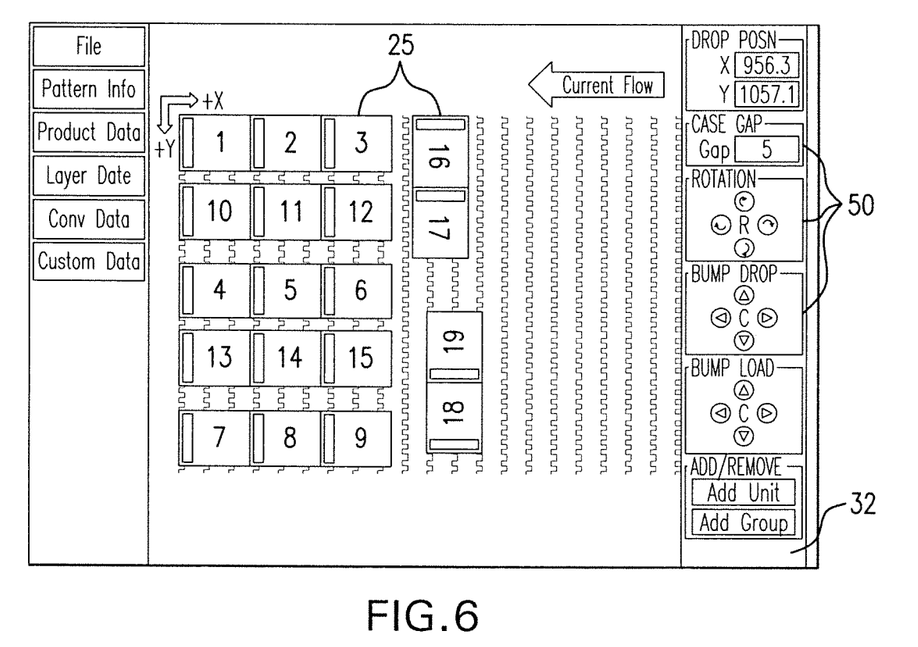
FIG. 6 illustrates a pallet design and/or programming application displayed on a GUI, according to one embodiment of this invention.

FIG. 6 illustrates a pallet design and/or programming application tool illustrated in GUI 32. The animation shows a system-generated animated conveyor 20, on which animated products 25 are displayed in a pallet layer layout configuration. In FIG. 6, the layout is not yet complete. The touchscreen controls 50 allow a user to add a product 25 to the layout animation. The products 25 can be shown as single products, or in groups of two and/or three, etc., as in FIG. 6. The controls 50 allow each added product image 25 to be rotated and otherwise moved into the layout to complete the layout configuration which then is used to program the robotic arm to make the layout using real products 25. Other configuration features, such as spacing between products can be controlled by inputs.

In embodiments of this invention, the apparatus includes a pallet depiction module configured to be executed by the control device to provide a virtual depiction of a palletization of a plurality of products via the graphical user interface. The module implements a method of illustrating the animating on the graphical user interface for confirmation of the palletization prior to initiation of the palletizer.

Figure 7:
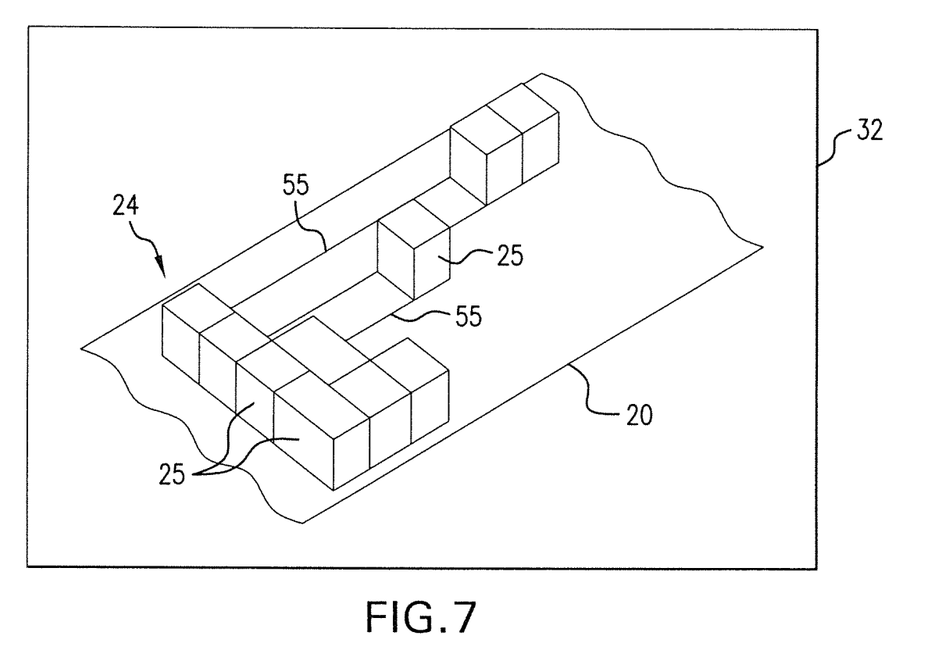
FIG. 7 shows an animated palletization displayed on a GUI, according to one embodiment of this invention.

FIG. 7 illustrates a pallet layout virtual depiction on a GUI 32 according to one embodiment of this invention. Illustrated product boxes 25 are animated, such as using any CAD animation technology, relative to each other as moving down animated conveyor 20, each in the placement that results in the proper final position in the product configuration layout. The products are animated and move separately and/or individually, but can be grouped in pairs, etc. The animation is desirably shown in an angled or isometric view, and can include phantom product paths 55 illustrated to show the track of the animated product 25. Desirably, the HMI of the GUI 32 includes animation controls, such as speed or reversal controls, to allow the operator user to adjust or pause the animation.

The animated virtual depiction of the palletization of FIG. 6 provides a graphical representation of what the operation software expects. The graphical depiction of the expected layout configuration allows the operator to more accurately set the physical configuration of the product to reduce the negative consequences of starting the equipment with a discrepancy between the physical layout and the expected layout. The isometric rendering of the virtual depiction can additionally or alternatively proceed in real time as the pallet build progresses, and be compared against the video feed, thereby providing more clarity as to how any discrepancy occurs between the actual product configuration and the expected configuration.

Figure 8:
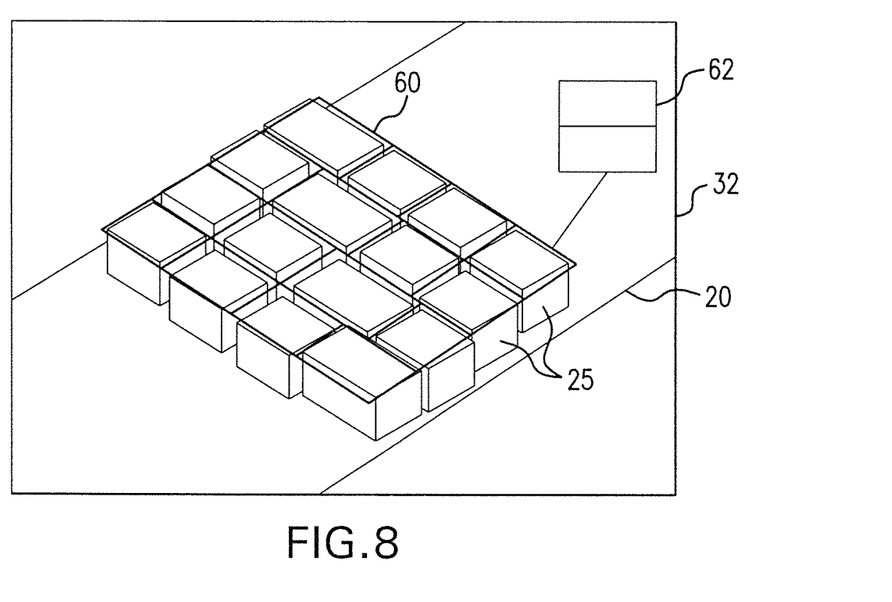
FIG. 8 illustrates an augmented reality layout confirmation on a live video feed displayed on a GUI, according to one embodiment of this invention.
Figure 9:
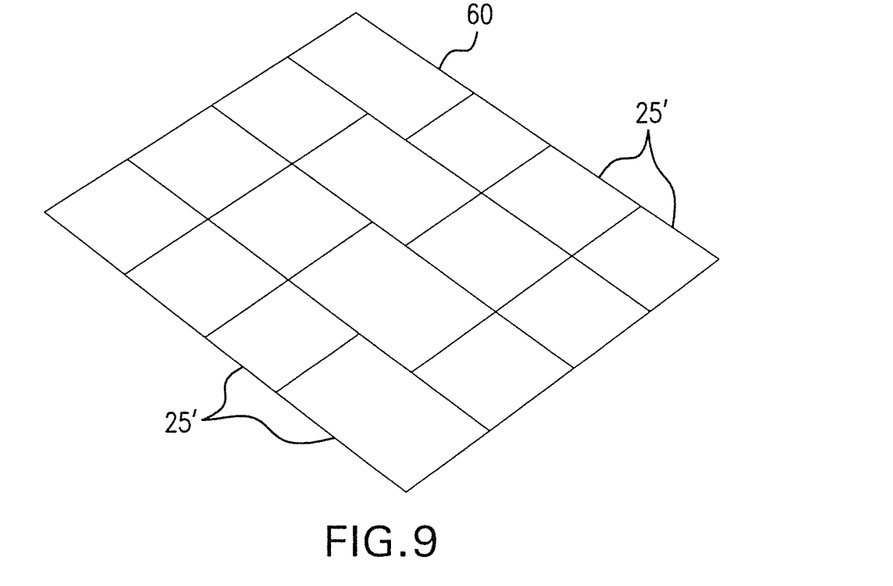
FIG. 9 shows the augmented reality layout of FIG. 8 separate from the GUI.
Figure 10:
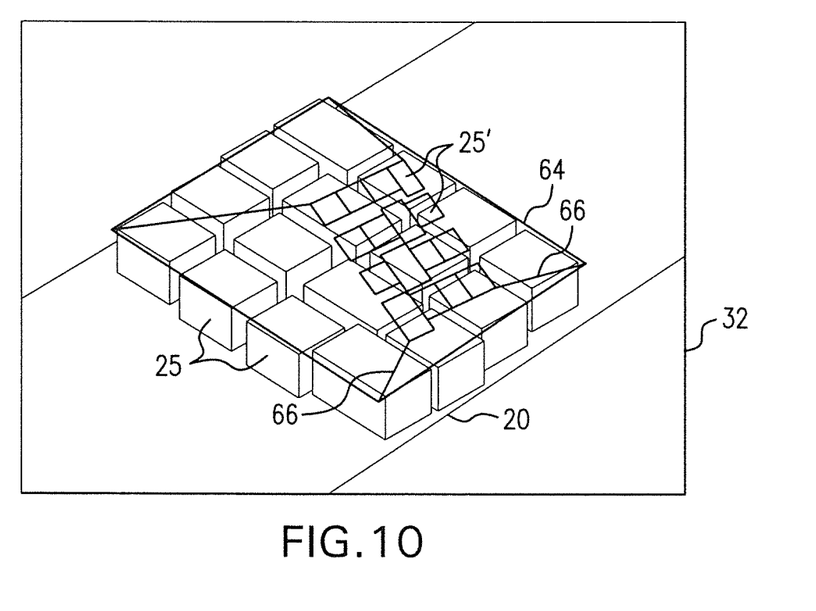
FIG. 10 illustrates an augmented reality layout setup or confirmation on a live video feed on a GUI, according to one embodiment of this invention.

FIGS. 8-10 illustrate a virtual depiction according to additional embodiments of this invention. The virtual depiction of these embodiments provides an augmented reality confirmation, in that the control software superimposes or overlays a computer-generated layout image on a video feed of the apparatus, thus providing a composite view. The augmented confirmation provided by the overlaying virtual layout provides the operator with a clear graphical depiction of how many products are expected and where each products should be on the conveyor. The virtual depiction is a multidimensional (2D or 3D) rendering presented on top of and aligned with the live video feed of the physical area where the product confirmation is to occur.

FIG. 8 shows an isometric video feed from a palletization apparatus video camera on GUI 32 showing the products 25 in a product configuration 24 on conveyor 20. The control device (not shown) includes a layout depiction module executable to provide a virtual outline depiction 60 of a palletization product layout of products 25 over the video feed. As shown in FIG. 8, the virtual depiction 60 is isometrically imposed over the top end of the products 25, with the peripheral outline of the virtual depiction 60 generally corresponding to the peripheral edges of the products 25 on the conveyor 20.

The virtual palletization product layout 60 overlays an area of the palletizer where the products should assemble, and matching the expected palletization product layout. As shown in FIG. 8, and more clearly in FIG. 9, the virtual product layout 60 includes a representation 25' for each product on the conveyor 20. Each representation 25' is a peripheral outline corresponding to one of the products 25 in a predetermined orientation expected by the software. The products 25 are not necessarily exactly placed to fit squarely within the corresponding virtual representations 25', but should be close enough to make it easy for an operator to see a discrepancy. Any product not correspondingly overlaid by the palletization product layout indicates a missing or an improperly positioned product. In some embodiments, an alert can be indicated if any product is too far outside the virtual overlay.

The size, shape, and configuration of the virtual depiction 60 can and will vary depending on need and the expected product layout of the pallet build. Each row of the virtual depiction 60 shows the expected number of products 25, and the orientation of each product. The products 25 are illustrated as squares and rectangles, and thus the virtual representations are as well. Other shapes, such as circles and ovals, can also be used. Information boxes, such as boxes 62, can be used to give information on the palletization product layout of the virtual depiction. The virtual depiction 60 can be shown at or moved to a different angle to the isometric video.

FIG. 10 shows a virtual depiction setup according to one embodiment of this invention. FIG. 10 shows a peripheral outline 64 as the expected placement of the products 25. Lead lines 66 connect the virtual depiction to the outline 64, such as for a higher-level technician to translate the image that is produced by the system onto the live feed, with the resulting image for the operator as shown in FIG. 8.

Before this invention, it was often difficult for operators to know how to manipulate the physical configuration of a product on a conveyor to correlate with the expected layout when errors occurred. If an operator needed to add products, there was uncertainty as to where to put them, and if products need to be removed, there can be uncertainty as to which ones. The clear graphical depiction of the animated and augmented confirmation of this invention allows the operator to more accurately set the physical configuration of the products to reduce the negative consequences of continuing the palletization with a discrepancy between the actual layout and the expected layout.

Thus, the invention provides methods and control systems for robotic palletizers. The use of app-based control platforms allow for ease of use, and animated virtual depictions allow operators to easily and efficiently monitor and correct product placement in pallet layer builds.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

The invention claimed is:

1. A method of monitoring a product pallet configuration by a palletizer, the palletizer including a product conveyor and a robotic arm extending over the product conveyor, the method comprising:
   providing instruction for an expected palletization product layer to the palletizer, the expected palletization product layer including predetermined layer placements for a plurality of products on the product conveyor;
   the robotic arm positioning each of the plurality of products on the product conveyor;
   forming on the product conveyor a product layer of the plurality of products for a pallet;
   providing a video feed of the product layer formed on the product conveyor;
   graphically overlaying a palletization product layout over the product layer on the video feed, wherein the palletization product layout includes a virtual peripheral outline of each and all of the plurality products in corresponding positions and orientations matching the predetermined layer placements of the plurality of products in the expected palletization product layer.

2. The method of claim 1, wherein the video feed shows palletization product layout over a top end of the products.

3. The method of claim 1, wherein the palletization product layout overlays an area of the palletizer where the products should assemble matching the palletization product layout.

4. The method of claim 1, wherein any product not correspondingly overlaid by the palletization product layout indicates a missing or an improperly positioned product.

5. The method of claim 1, wherein the palletization product layout comprises a virtual outline of the palletization to be performed by the palletizer.

6. The method of claim 1, further comprising animating the movement of each of the products relative to each other one or more conveyors of the palletizer.

7. The method of claim 1, wherein a graphical user interface is attached to the palletizer to display the video and the palletization product layout.

8. A palletizer, comprising:
a product conveyor;
a robotic arm extending over the product conveyor, wherein the robotic arm places each of a plurality of products in a predetermined position on the conveyor to form a product layer for a pallet;
a control device in operable connection with the product conveyor and the robotic arm;
a graphical user interface in combination with the control device;
a video recording device in combination with the product conveyor and the control device; and
a virtual depiction of an expected palletization product layout of a completed pallet layer of a plurality of products on the product conveyor, the virtual depiction showing a virtual peripheral outline of a predetermined layer placement of each and all of the plurality of products in the expected palletization product layout superimposed over a video feed from the video recording device via the graphical user interface.

9. The palletizer of claim 8, wherein the video recording device provides the video feed of the product layer formation.

10. The palletizer of claim 8, wherein the virtual depiction is correspondingly angled to match a recording angle of the video feed.

11. The palletizer of claim 10, wherein the virtual depiction comprises an animated depiction of a formation of the palletization.

12. The palletizer of claim 10, wherein the virtual depiction illustrates placement of a number of products expected for the palletization by the control device.

13. The palletizer of claim 10, wherein the virtual depiction comprises an outline of a top periphery of each of the products in a predetermined orientation.

14. The palletizer of claim 10, wherein the virtual depiction comprises an isometric rendering of the expected palletization product layout.

15. The palletizer of claim 8, wherein the virtual depiction comprises a plurality of rectangular or square outlines each corresponding to one of the products.

16. The palletizer of claim 15, wherein the virtual depiction comprises a plurality of rows of the outlines representing the rows of the palletization product layout.

17. The palletizer of claim 8, wherein the control device compares to virtual depiction to the products on the video feed and provides an alert through the graphical user interface when a discrepancy is determined.

* * * * *